United States Patent [19]
Cohen et al.

[11] Patent Number: 5,993,697
[45] Date of Patent: Nov. 30, 1999

[54] METALLIC CARBON MATERIALS

[75] Inventors: Marvin Lou Cohen, Berkeley, Calif.; Vincent Henry Crespi, Darien, Ill.; Steven Gwon Sheng Louie, Berkeley; Alexander Karlwalter Zettl, Kensington, both of Calif.

[73] Assignee: The Regents of the University of California, Oakland, Calif.

[21] Appl. No.: 08/649,143

[22] Filed: May 14, 1996

[51] Int. Cl.⁶ .............................. H01B 1/04; C01B 31/00
[52] U.S. Cl. ................ 252/502; 423/445 B; 423/445 R; 423/447.2
[58] Field of Search ........................... 423/445 R, 445 B, 423/447.3, 447.2; 252/502

[56] References Cited

U.S. PATENT DOCUMENTS

| | | | |
|---|---|---|---|
| 5,110,577 | 5/1992 | Tamor | 423/445 R |
| 5,401,975 | 3/1995 | Ihara | 423/445 B |
| 5,626,812 | 5/1997 | Ebbesen | 423/445 B |

OTHER PUBLICATIONS

Iijima, S. "Growth of Carbon Nanotubes," Materials Science and Engineering, B19 (1993), pp. 172–180.
Dunlap, B. I. "Connecting Carbon Tubules," Physical Review B, vol. 46, #3, pp. 1933–1936, Jul. 1992.
Ajayan, P. M. et al., "Distribution of Pentagons and Shapes in Carbon Nanotubes," Chem. Phys. Lett., vol. 202, No. 5, pp. 384–388, Jan. 1993.

*Primary Examiner*—Wayne Langel
*Assistant Examiner*—Peter DiMauro
*Attorney, Agent, or Firm*—Coudert Brothers

[57] ABSTRACT

Novel metallic forms of planar carbon are described, as well as methods of designing and making them. Nonhexagonal arrangements of carbon are introduced into a graphite carbon network essentially without destroying the planar structure. Specifically a form of carbon comprising primarily pentagons and heptagons, and having a large density of states at the Fermi level is described. Other arrangements of pentagons and heptagons that include some hexagons, and structures incorporating squares and octagons are additionally disclosed. Reducing the bond angle symmetry associated with a hexagonal arrangement of carbons increases the likelihood that the carbon material will have a metallic electron structure.

21 Claims, 6 Drawing Sheets

METALLIC CARBON MATERIALS

This invention was made with U. S. Government support under Contract No. DE-AC03-76SF00098 between the U.S. Department of Energy and the University of California for the operation of Lawrence Berkeley Laboratory. The U. S. Government may have certain rights in this invention.

I. BACKGROUND OF THE INVENTION

1. Field of the Invention

This invention relates generally to carbon materials and more specifically to metals primarily comprising carbon.

2. Description of Related Art

Lightweight conductors are very desirable and many ways of making them have been explored. All of the materials considered to date reported have unfortunately manifested flaws that make them impractical.

Graphite is an attractive starting material because it is lightweight, strong within its atomic plane, and chemically stable. However, it's Fermi surface which separates occupied electronic states in k-space from unoccupied ones (frequently, the overlap of the conduction band edge and the valence band edge) is vanishingly small and graphite has only a very small number of unfilled low-energy electronic states. It falls into a category of materials known as semimetals and is a poor conductor (Kittel, Charles, *Introduction to Solid State Physics*, 6th ed.; John Wiley & Sons, 1986, pgs 212–213). It would be highly desirable to construct a form of carbon that combined the advantageous material properties of graphite with a higher electrical conductivity than graphite has.

Like semiconductors, semimetals can be doped with appropriate impurities to increase or decrease the relative concentration of holes and electrons, thus varying the conductivity. M. S. Dresselhaus and G. Dresselhaus describe the preparation and properties of doping graphite with intercalation compounds in the review article, "*Intercalation compounds of graphite*", Advances in Physics, 30(2): 139–326, 1981. They describe methods to introduce metals having low ionization energies, for example lithium, potassium, and rubidium, between sheets of graphite. Any outer electrons of the intercalated metal may be pulled into the graphite sheet and thereby increase the carrier concentration and the in-plane conductivity of the doped graphite. A major deficiency in graphite conductors made in this manner is their lack of stability in air. When the doped graphite is exposed to air, the metal atoms leave the graphite structure and react with air to form oxygen containing compounds, and the availability of carriers to the graphite plane is compromised. Intercalated graphite materials appear stable primarily at very low temperatures, far below room temperature. It would be advantageous to develop a form of graphite that had adequate carrier concentration to be a conductor without loss of stability, at room-temperature or in contact with air.

Graphite is composed of carbon atoms arranged in a planar hexagonal array. Each carbon is $sp^2$ bonded to three other carbons. Perturbation of these bonds can lead to changes in the properties of the material. Harold Kroto reviewed the properties of $C_{60}$ and other arrays resulting from introduction of "defects" in the hexagonal array. For example, he describes that ". . . 12 pentagonal "defects" convert a planar hexagonal array of any size into a quasi-icosahedral cage . . . " (H. Kroto, *Space, Stars, $C_{60}$ and Soot*, Science, 242: 1139–1145, Nov. 25, 1988). Materials composed entirely of hexagons to which 12 pentagons are added are known as fullerenes, because some of the structures that occur (particularly $C_{60}$ made from 20 hexagons and 12 pentagons) resemble Buckminster Fuller's geodesic domes. Fullerenes are very stable but are not electrical conductors. Solid $C_{60}$ in particular is an insulator. Larger fullerenes are also insulating, until at sufficiently large size they take on some semimetal properties, similar to graphite. None of the fullerenes conduct better than graphite and none are planar. Doping fullerenes with alkali atoms to make them electrically conducting has the same problems discussed above for doping graphite. They are not stable in air.

Sumio Iijima constructed nanotubes made exclusively of carbon. Starting with graphite rolled into tubes, he used pentagons to cap the tubes and heptagons to create a negative curvature in the graphitic plane (Sumio Iijima, *Growth of carbon nanotubes*, Materials Science and Engineering, B19: 172–180, 1993). Iijima used permutations in bond angles, that is introduced pentagons and heptagons into the graphite configuration, to change the physical geometry of nanotubes or carbon spheroids. Since the length of the nanotube is composed of hexagons and the tubes have a large diameter, Iijima's nanotubes are limited to a conductivity comparable to that of graphite.

N. Hamada, et al. (*New One-Dimensional Conductors: Graphitic Microtubules*, Phys. Rev. Let. 68(10):1579–81, Mar. 9, 1992) predicted that carbon microtubules could exhibit metallic electronic transport properties as a function of the diameter of the tubule and the degree of helicity. Following their techniques, Hamada showed that a tube having an index of 4,4 is metallic. The naming convention of R. Saito, et al. (R. Saito, M. Fujita, G. Dresselhaus, and M. S. Dresselhaus, Appl. Phys. Lett. 60:2204, 1992) is used. A conventional tight binding calculation reveals that this nanotube has 0.07 allowed states for electrons per eV per atom. Conductivity is proportional to the number of allowed states per electron per eV per atom. The tube has a diameter, easily calculated using conventional techniques, of 5.3 Å. Using the same type of calculations, a tube having an index of 8,8 is shown to have a slightly larger diameter of 10.6 Å would have only 0.035 states per electron volt per atom. Utility of Hamada's structures is limited by the low density of allowed electron states and because the nano-tube diameters are so small that they function essentially as one-dimensional structures. One-dimensional structures can exhibit electron localization phenomena which destroys the tube's metallic properties (Anderson, Physical Review, 109:1492, 1958).

It would be extremely advantageous in many ways if a stable, electrically-conducting material that was as lightweight and strong as graphite could be constructed. It would be particularly useful if it could be constructed in a planar configuration and exhibit a density of states at the Fermi energy of at least about 0.1 states per electron volt per atom.

II. SUMMARY OF THE INVENTION

It is an object of this invention to provide a metallic electrically-conducting material that is comparable in strength and density to graphite. It is a further object of this invention that the new inventive material is a good metal, exhibiting a density of states at the Fermi energy of at least about 0.1 states per electron volt per atom. It is a further object of this invention to provide a method for making the inventive material.

The new inventive material comprises primarily carbon atoms arranged in a two dimensional configuration. The material may comprise a single layer or multiple layers. The carbon atoms bind to their neighboring carbon atoms asymmetrically, that is the angles between the three carbon—carbon bonds are not equal, and have a metallic band structure. The carbon—carbon bonds in the novel metallic carbon are distorted $sp^2$ bonds.

In one form the inventive material comprises essentially pure carbon arranged in a two dimensional array of five and seven membered carbon rings that form geometric shapes of pentagons and heptagons. In another form, up to about 25% of the atoms are not carbons or are carbons not having three asymmetric bond angles, said up-to-about-25% of the atoms not being clustered together. In yet another embodiment of the inventive material, the metallic carbon is rolled into tubes.

IV. DETAILED DESCRIPTION OF THE INVENTION

The new inventive material comprises primarily carbon atoms arranged in a two dimensional configuration. The carbon atoms bind to their neighboring carbon atoms asymmetrically and have a metallic band structure. The carbon—carbon bonds in the novel metallic carbon are distorted $sp^2$ bonds.

The novel inventive material comprises carbon atoms configured in a planar arrangement of five and seven membered carbon rings, i.e. pentagons and heptagons. The material is a good metal. A single sheet of the inventive material, one atom thick, is mechanically strong, covalently bonded, and electrically conducting.

Use of the term "metallic carbon" herein means carbon atoms bonded to neighboring carbon atoms asymmetrically and having a metallic band structure.

Use of the term "pentaheptite" herein means a structure of carbon atoms arranged in pentagons and heptagons to produce two dimensional metallic carbon.

Figure 4:
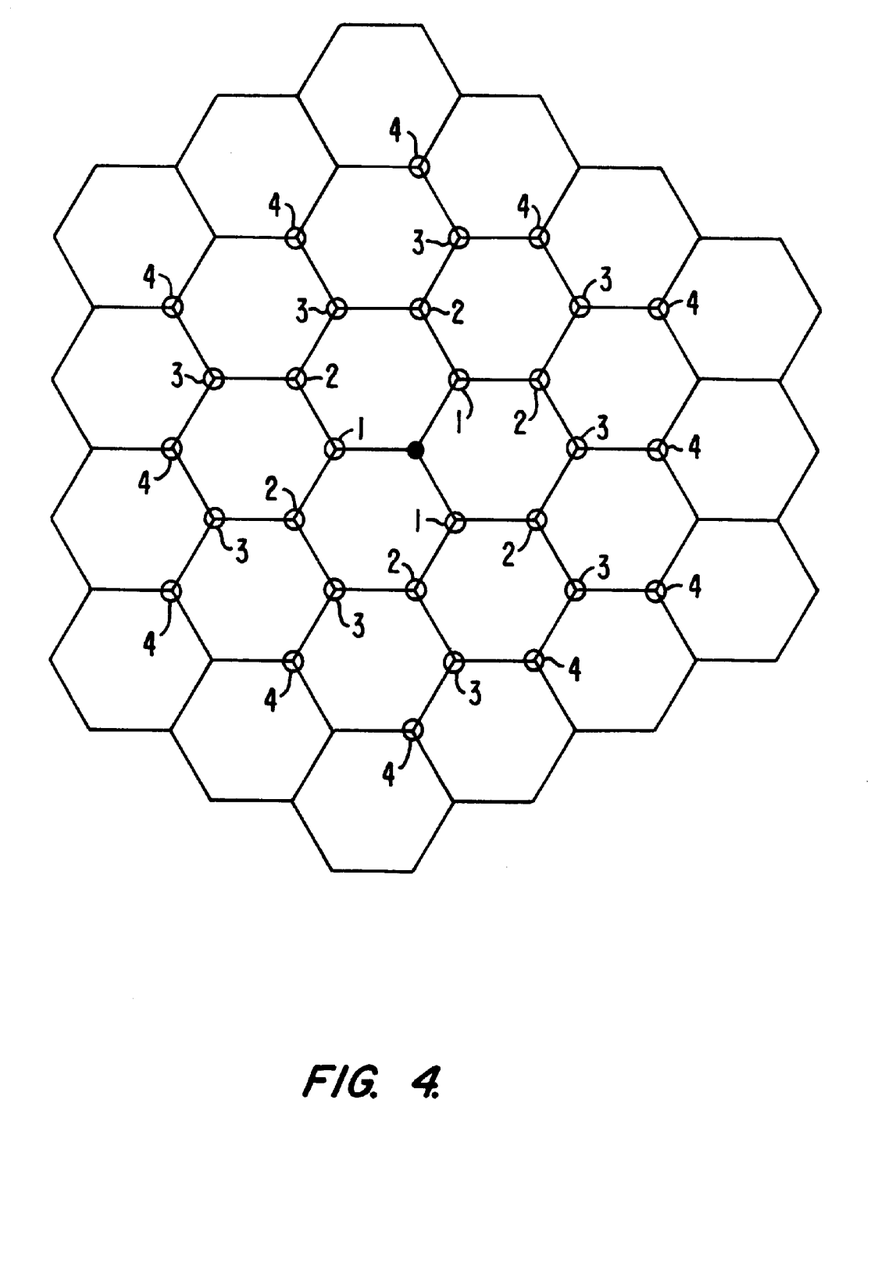
FIG. 4: illustrates a region that is exclusively hexagons.

Use of the term "exclusively hexagons" herein means any region formed by an atom which is surrounded only by hexagons up to the fourth neighboring atom, counted along sequential contiguous bonds emanating from the central atom, as illustrated in FIG. 4.

Use of the term "primitive cell" herein means the smallest subunit of a structure that can be repeated to form the entire structure.

Use of the term "locally metallic region" herein means a area or volume of material having a uniform average value of conductivity, $\sigma$, where $\sigma > 500$ Mho $cm^{-1}$.

Use of the term "bulk metallic material" herein means a large volume or area of material, comprising several locally metallic regions and possibly comprising some locally non-metallic regions, wherein the locally metallic regions may exhibit different conductivity values, but wherein the locally metallic regions form one or more contiguous paths having metallic properties.

Throughout this document, an n-membered carbon ring is referred to by the geometric shape it forms. For example, a five-membered carbon ring is referred to as a "pentagon". In this nomenclature, each vertex of the polygon represents a carbon and the sides of each polygon represent bonds.

Use of the term "threefold vertice(s)" herein means that an atom is bonded to three other atoms by three bonds.

An isolated graphite sheet is a semimetal with $\pi$ and $\pi^*$ bands touching at a pointlike Fermi surface (where the * denotes antibonding). The hexagonal configuration of carbon atoms in graphite exhibits a three-fold bond-angle symmetry. That is, a graphite sheet that is rotated by 120 degrees or by 240 degrees will be congruent with the graphite lattice in its original position. Additionally, if the sheet is moved laterally for a set distance, it will be congruent with the graphite lattice in its original position. A reduction in bond-angle symmetry below the hexagonal 3-fold symmetry eliminates the semimetallic behavior in graphite if significant band gaps open near the Fermi level. The present invention comprises a carbon material with a large fraction of atoms having less than 3-fold bond angle symmetry in a structure which favors a band-overlap metal. In one embodiment, the present invention provides an example of a pure-carbon planar metal composed of an array of pentagons and heptagons which may be arranged in a periodic configuration. Criteria for carbon structures to exhibit metallic properties.

Inventive carbon structures that exhibit metallic properties are configured entirely of interconnected four-member, five-member, six-member, seven-member, and eight-member rings, which form a geometric arrangement of squares, pentagons, hexagons, heptagons, and octagons, where each vertex of a polygon represents a carbon and the sides of each polygon represent bonds.

Carbons configured to meet the three criteria below were found to exhibit metallic properties:

First, no more than three pentagons or three heptagons share a common vertex. The vertex is the location of a carbon atom and the lines emanating from a vertex (the side of a polygon) represent bonds between adjacent carbons. To construct a carbon material in which no more than three pentagons or three heptagons share a common vertex, place two pentagons adjacent to one-another, sharing a side. Attach either hexagons or heptagons to the other four sides of each pentagon. Every vertex shared by the polygons is formed by three lines, that is, the carbons all have three bonds. Additionally one of the three bond angles formed is different from the other two. Additional pentagons, hexagons and heptagons are added in the same fashion. Between 70% and 100% of the carbon rings in the material must meet this criterion. Preferably, between 80% and 100% of the carbon rings in the material meet this criterion. Even more preferably, between 90% and 100% of the carbon rings in the material meet this criterion.

Second, to guarantee that the structure is not excessively curved in any small region of the plane, the number carbon atoms are arranged into an approximately equal number of pentagons and heptagons. To insure this condition is met, any polygon in the structure is selected. The originally selected polygon, all its neighboring polygons, and all the polygons which neighbor those neighbors are counted. In the planar geometry, the maximum number of polygons found in this group is twenty-five. The absolute value of the difference between the number of pentagons and the number of heptagons in this group should be less than 1/7 of the total number of polygons. [That is, subtract either the number of pentagons or the number of heptagons from the total. Divide the result by the total number of polygons. The result should be a fraction less than 1/7.] Planarity can also be essentially maintained when some four-membered carbon rings (squares) and/or eight-membered carbon rings (octagons) are incorporated into the structure. In order to maintain approximate planarity, a four-membered ring can replace two five-membered carbon rings. Similarly, one eight-membered carbon ring can replace two seven-membered carbon rings.

Third, the number and arrangement of hexagons is limited. A small number of hexagons mixed into the structure does not destroy the metallic nature of the material. A continuous region of hexagons of sufficiently large size will not be metallic in its interior (instead it is a semimetal or very low density of states metal like graphite). The fully metallic character of a single sheet is lost in any region that is "exclusively hexagons". (An exclusively hexagon region is illustrated schematically in FIG. 4, where the number near the vertices of the hexagons label the first through forth atoms connected to the central atom via sequential, contiguous bonds.) There is an exception to this constraint however, when the interactions are between stacked sheets in a multi-sheeted structure. In that case, the constraint is relaxed, as discussed in the next paragraph.

Sheets of the inventive metallic carbon may be stacked to form a layered structure. The alignment between the sheets is, in general, unimportant for the metallic nature and stability of the material (materials are metallic without regard for the details of the alignment between sheets). The one exception is where regions are comprised exclusively of hexagons. If a region, that is "exclusively hexagons" in one layer, is in contact with a region in an adjacent layer that is non-exclusively hexagons, then the metallic properties are maintained in the "exclusively hexagonal" layer. In a multilayer material, full metallic properties are lost only if at least three layers contain adjacent regions of exclusively hexagons, where the regions of exclusively hexagons in each layer are defined above. The full metallic nature is then lost for hexagons in a given sheet which are surrounded by only hexagons up to forth neighbors within the sheet, and are adjacent to hexagons in both adjacent sheets which are also surrounded by exclusively hexagons up to forth neighbors within the adjacent sheets.

The minimal size for a region of metallic carbon is a region of 16 contiguous atoms. There is no maximum size for metallic behavior.

Several minor deviations from perfect planarity can exist in the inventive material without loss of metallic properties. First, the sheets of atoms may curve slightly up and down as discussed above. Second, the structure as a whole may be curved into a cylindrical shape as long as the radius of curvature is larger than 3 Angstroms. Then, as long as the three criteria listed above are met, the metallic nature of the carbon is maintained in spite of some structural curvature.

Additionally, inventive metallic carbon will retain its metallic properties as long as fewer than 1/8 of the total number of atoms in the structure have four bonds instead of three.

In theory, a metallic carbon like pentaheptite is formed entirely from carbon. In practice, however, other materials may be present in a sheet without substantial loss of metallic properties. Furthermore, or alternatively, some regions of a sheet of the inventive carbon may be arranged in other configurations that are not metallic, so long as the concentration of metallic carbon is high enough to confer overall metallic properties, such as electrical conductivity to the sheet. Substituting boron or nitrogen atoms for a fraction of the carbon atoms modifies the electronic properties of the inventive carbon material. A boron atom has one less electron than carbon and a nitrogen atom has one more electron than carbon.

Because the new inventive metallic carbon has an enhanced density of electronic states at the Fermi level (related to an increase in the size of the Fermi surface), it has significantly different optical properties from graphite. The optical properties of metallic carbon are characteristic of metals, having, for example, high reflectivity, while retaining the mechanical properties of a graphite structure. The frequency dependence of the reflection, transmission and absorption of light are different from those of graphite. Composite materials, comprising graphite and metallic carbon, can be arranged in novel optical contrast patterns at both the macroscopic and nanometer length scales in optical devices. The optical devices are formed by combining graphite and metallic carbon side-by-side in a single layer of planar material or stacking layers so that the metallic and non-metallic portions are juxtaposed appropriately.

EXAMPLE 1

Pentaheptite

Figure 1:
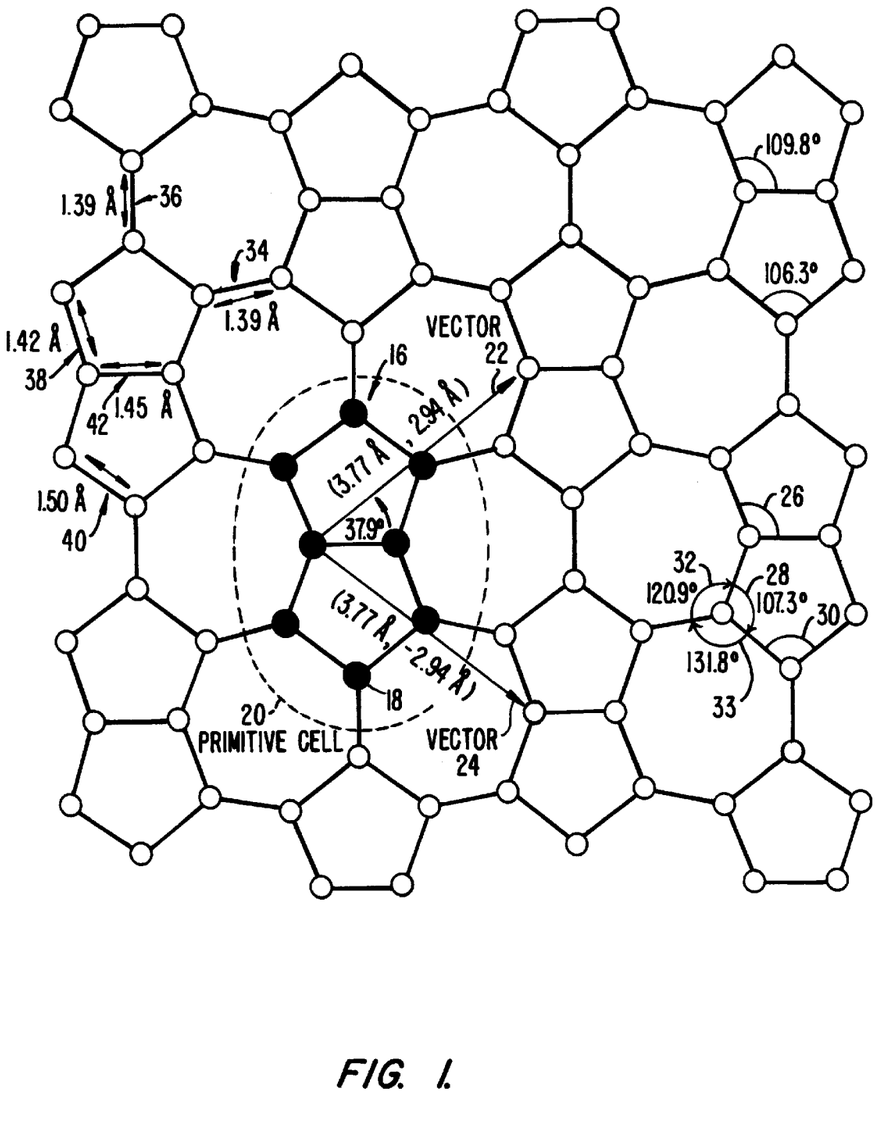
FIG. 1: illustrates the equilibrium structure of carbon atoms arranged in pentagons and heptagons to produce an example of two-dimensional metallic carbon (pentaheptite).

The inventive pentaheptite is based upon the simplest possible way of tiling a plane with a periodic network of pentagons and heptagons. As shown in FIG. 1, each pentagon is adjacent to one pentagon and four heptagons. Each heptagon is adjacent to four pentagons and three heptagons. Two carbon atoms are shared by two pentagons and a heptagon, the other six carbon atoms being shared by one pentagon and two heptagons.

In order to maintain a two-dimensional structure with equal numbers of pentagons and heptagons, the inventive material was constructed so that each carbon had three distorted $sp^2$ bonds and at least one of the bond angles was different from the other two.

Nearest-neighbor curvature effects of pentagonal and heptagonal rings limit the number of plausible two-dimensional carbon networks. If a pentagon has only heptagonal neighbors, the incipient local negative curvature imposes a large energetic cost. If a pentagon has two or more pentagonal neighbors, the incipient local positive curvature imposes a similar large energetic cost. Bond length and bond angle variation in the planar structure is minimized when each pentagon has one pentagonal neighbor. The inventive material was also developed to have a small primitive cell.

Figure 1A:
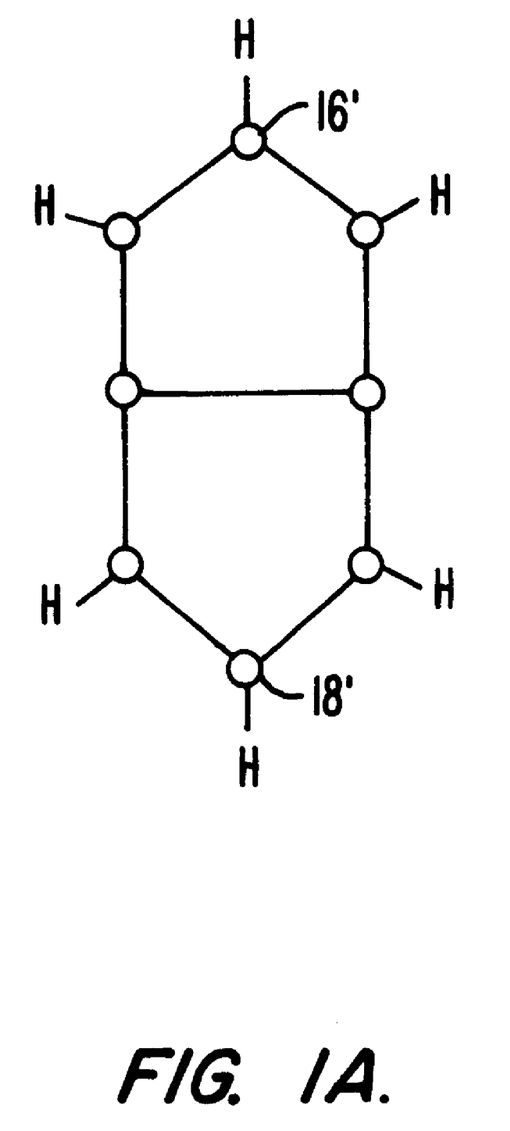
FIG. 1A: presents a diagram of the structure of pentalene.

Turning now to FIG. 1, it can be seen that the primitive cell 20 for pentaheptite is made up of eight carbon atoms that form two adjacent five-membered rings, referred to by their geometry as "pentagons". Carbons 16 and 18 are the apical carbons (they correspond to carbons 16' and 18' in pentalene, FIG. 1A). Vectors 22 and 24 show the displacement of the primitive cell that forms the heptagon structures (or seven-membered carbon rings) beside the pentagons. Angles 26, 28, and 30 form three interior angles of the pentagon, which in this embodiment are about 109.8°, about 107.3°, and about 106.3° respectively. Interior angles of the pentagon were found to vary between about 100° and about 115°.

The interior angles of heptagons were found to vary between about 110° and about 140°.

As described in the general description above, four-membered carbon rings (squares) can be incorporated into the inventive material at a ratio of one square for each two pentagons. The interior angles of the squares were found to vary between about 80° and about 100°.

Also as described in the general description above, eight-membered carbon rings (octagons) can be incorporated into the inventive material at a ratio of one octagon for each two heptagons. The interior angles of the octagons were found to vary between about 130° and about 140°.

In FIG. 1, angles 28, 32, and 33, are one example of the three angles formed by the three carbon—carbon bonds surrounding carbons in the inventive material. At least one of the three bond angles must be unequal to the other two. In this example of pentaheptite, angles 28, 32, and 33, are 107.3°, 120.9°, and 131.8° respectively. These bond angles may vary +/-3°.

In other configurations besides pentaheptite, bond angles may vary in practice between about 100° and about 140°. Computed variations are between 106° and 131°.

In the pentaheptite sample illustrated in FIG. 1, heptagon bonds 34 and 36 were 1.39 Å in length. Pentagon bonds 38, 40, and 42 are 1.42 Å, 1.50 Å, and 1.45 Å respectively. The strength of the bond is a function of the bond length; a bond with a shorter length is stronger than a bond with a longer length.

The inventive pentaheptite material was designed by rotating selected bonds in hexagonal graphite with the aid of computer modeling using a program developed by the inventors (see "Atomic Design" section below). The material was subsequently annealed within tight-binding total energy molecular dynamics (C. H. Xu, C. Z. Wang, C. T. Chan and K. M. Ho, Journal of Physics-Condensed Matter, 4:6047, 1992). Calculations were performed on IBM RS/6000 workstations and on a Cray supercomputer. The anneal was performed on a finite 141 atom sheet. After initial local relaxation, the atomic positions were perturbed randomly by about 0.1 Angstroms from equilibrium and the structure was annealed from 2500 K for 2.7 picoseconds. Upon cooling the atoms returned to the essentially planar equilibrium positions. Then atomic coordinates were obtained Unit cell coordinates were extracted from the atoms in the center of the sheet. Comparison across the interior atoms indicated that finite size-effects perturbed atomic positions by less than 0.01 Angstroms. Bond lengths and angles are shown in FIG. 1.

It is instructive to compare bond lengths in planar carbon pentaheptite with those in pentalene, the molecule formed by terminating with hydrogens the dangling bonds of the pentaheptite cell 20 highlighted in FIG. 1. The major difference is a lengthening of bonds to the apical carbons 16, 18, 16', and 18', from about 1.4 Angstrom (A) in pentalene (A. Toyota, M. Kataoka, and S. Koseki, Chem. Lett. May 1992, p. 791.) to 1.50 Å in pentaheptite. The carbon atoms making up these bonds in pentaheptite share 1.39 Å carbon—carbon bonds with atoms in the neighboring unit cells, in contrast with the weaker, but analogous, C—H bonds in pentalene. In pentaheptite the increase in bond strength for the intercell bonds is accompanied by a decrease in the effective bond number and consequent dilation of the intracell bonds to the apical carbons. We note that the dilation of the pentaheptite C—C bonds from graphitic bond lengths combined with the more open nature of the planar carbon pentaheptite structure yield an atomic density, per unit area, of one carbon atom per 2.77 $Å^2$, 5% less than the graphitic density. Carbon—carbon bonds in graphite are about 1.42 Å while in pentaheptite bonds 36, and 34 are shortened to 1.39 Å and bonds 40, and 42 are lengthened to 1.50 Å and 1.45 Å respectively. The magnitude of the change is larger for the lengthened bonds, resulting in a less dense material.

Electronic structure and total energy calculations were performed on the single-sheet periodic structure extracted from the finite sheet simulation. Within the tight-binding total energy scheme, the energy of a single infinite sheet of carbon pentaheptite is about 0.32 eV per atom greater than that of single-sheet graphite. By comparison, within the same scheme $C_{60}$ is about 0.4 eV per atom greater than single-sheet graphite. A local density approximation ab initio pseudopotential calculation using the same atomic coordinates yields an energy difference of 0.33 eV per atom between isolated sheets of pentaheptite and graphite. The bond rotation which generated the topology of pentaheptite also provides a kinetic pathway to graphite. Fixing the absolute angle of a single rotated bond in the center of the 141 atom sheet and annealing and relaxing atomic coordinates up to third nearest neighbors, including the bond length of the rotated bond, yields an energy barrier within tight-binding total energy of about 7 eV for the about $\pi/2$ rotation of a single non-symmetry axis interheptagonal bond and local conversion of pentaheptite into graphite. The final relaxed structure after the single bond rotation is 0.17 eV, less than that of planar pentaheptite. A single sheet of planar carbon pentaheptite is metastable against bond rotation and local formation of a hexagonal network. There is a large energy barrier for breaking the two C—C bonds necessary for pentaheptite to convert to graphite. Global conversion of single-sheet pentaheptite to graphite by simultaneous rotation of all relevant bonds is expected to have a comparable energetic barrier. More complex kinetic paths can be envisioned, but all require the breaking and reformation of two C—C bonds per bond rotation so that a large energetic barrier is likely for the isolated sheet. The rigidity of the nearly $sp^2$ carbon framework further protects against the possibility of soft modes. The fact that the pentaheptite structure was shown to be stable during the 2500 K anneal provides further evidence of the stability of the structure. All evidence available suggests that an isolated sheet of carbon pentaheptite is metastable towards conversion to lower energy carbon allotropes.

Figure 2A:
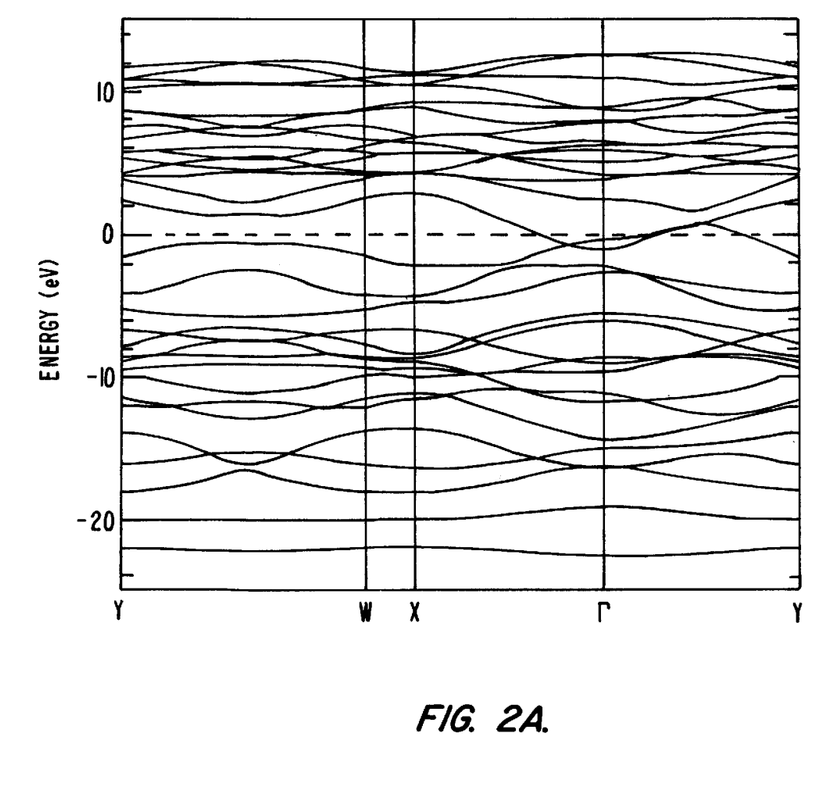
FIG. 2A: shows the band structure for an infinite sheet of pentaheptite like that shown in FIG. 1.
Figure 2B:
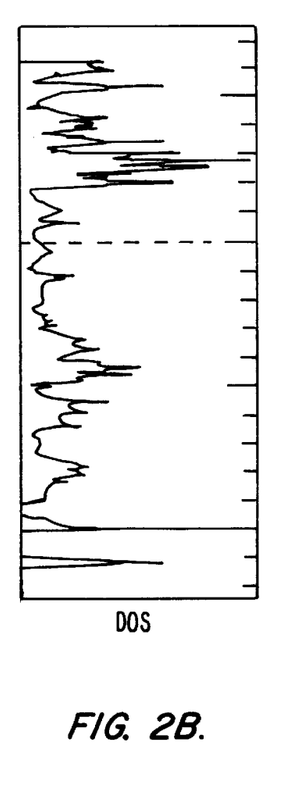
FIG. 2B: shows the density of states for an infinite sheet of pentaheptite.

The tight-binding band structure and density of states of a single sheet of carbon pentaheptite are shown in FIGS. 2A and 2B, respectively. In FIG. 2A, the dashed line marks the Fermi energy, $E_F$. Bands are plotted along high symmetry lines of the Brillouin zone. The deviation from perfect $sp^2$ bond angles raises the a bands. The lack of hexagonal symmetry then fills in the $\pi$-$\pi$* pseudogap present at the Fermi level of single-sheet graphite, yielding a density of states at the Fermi level of about 0.1 states per eV per atom. These calculations were made using the graphite $sp^2$ Slater-Koster tight-binding parameters of Tomanek and Louie. The distance dependence of the parameters is taken to be a linear interpolation between graphite first and second neighbor parameters (D. Tomanek and S. G. Louie, Phys. Rev. B 37:8327, 1988). In comparison, the density of states for the smallest plausible metallic nanotube, the 5.3 Angstroms diameter (4,4) tube, is 0.07 states per eV per atom (naming convention of R. Saito, M. Fujita, G. Dresselhaus, and M. S. Dresselhaus, Appl. Phys. Lett. 60:2204, 1992, is used. For larger (n,n) metallic nanotubes the densities of states per atom drop inversely proportional to the tube radius, indicating that planar carbon pentaheptite is the largest density of states pure-carbon crystalline allotrope.

EXAMPLE 2

Tubular Forms

Figure 2C:
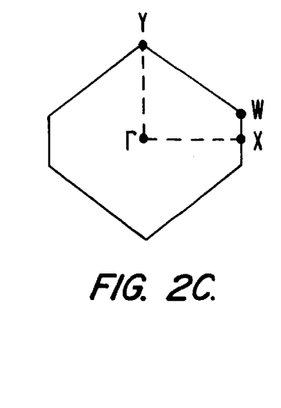
FIG. 2C: shows the high symmetry lines of the Brillouin zone.

The planar pentaheptite structure can be rolled into tubes indexed in a manner similar to graphite, wherein tubes are labeled (n,m) with n and m defining the number of steps along the directions of periodicity in the sheet that are necessary to complete one full circuit around the circumference of the tube. In this naming convention, n is in the direction of vector 22 and m=is in the direction of vector 24. Because pentaheptite has a rhomboid structure (unlike graphite) we must consider tubes with $0 \leq |m| \leq n$ instead of simply $0 \leq m \leq n$. As shown in FIG. 2C, a carbon pentaheptite sheet, unlike a graphite sheet, has a large Fermi surface which surrounds the Γ-point (k=0). The reflection symmetry of the bands along the YW-line is due to time-reversal invariance, $E(k)=E(-k)$. The states nearest $E_F$ have π-character, and those farthest away are σ states. Since the Γ-point in a tube is always allowed, and since pentaheptite in a sheet has allowed states surrounding Γ, pentaheptite when rolled in a tube is always a metal. As described by N. Hamada, S. Sawada, and A. Oshiyama, (Phys. Rev. Lett. 68:1579, 1992), when the Fermi Surface is large, folding the bands by imposing periodic boundary conditions along the circumference always results in allowed electron states at the Fermi energy. Thus, tubes of pentaheptite are metallic, independent of radius and helicity.

EXAMPLE 3

Superconducting Forms

The nonzero Fermi level density of states of planar carbon pentaheptite motivates a brief discussion of superconductivity Since both metallic doped graphite and metallic doped $A_3C_{60}$ [A=KRb(s)] are superconducting, we now consider the superconducting properties of our inventive form of metallic carbon, pentaheptite. Deviation from perfect $sp^2$ bond angles in-plane may increase the electron-phonon matrix elements above the values in graphite. $T_c$ of undoped pentaheptite is likely to be small or moderate. Alkali doping to a stochiometry of about $AC_4$, corresponding to one alkali atom per heptagon, increases the density of states at the Fermi level and increases the superconducting Tc substantially.

EXAMPLE 4

Atomic Design of the Material

Figure 3:
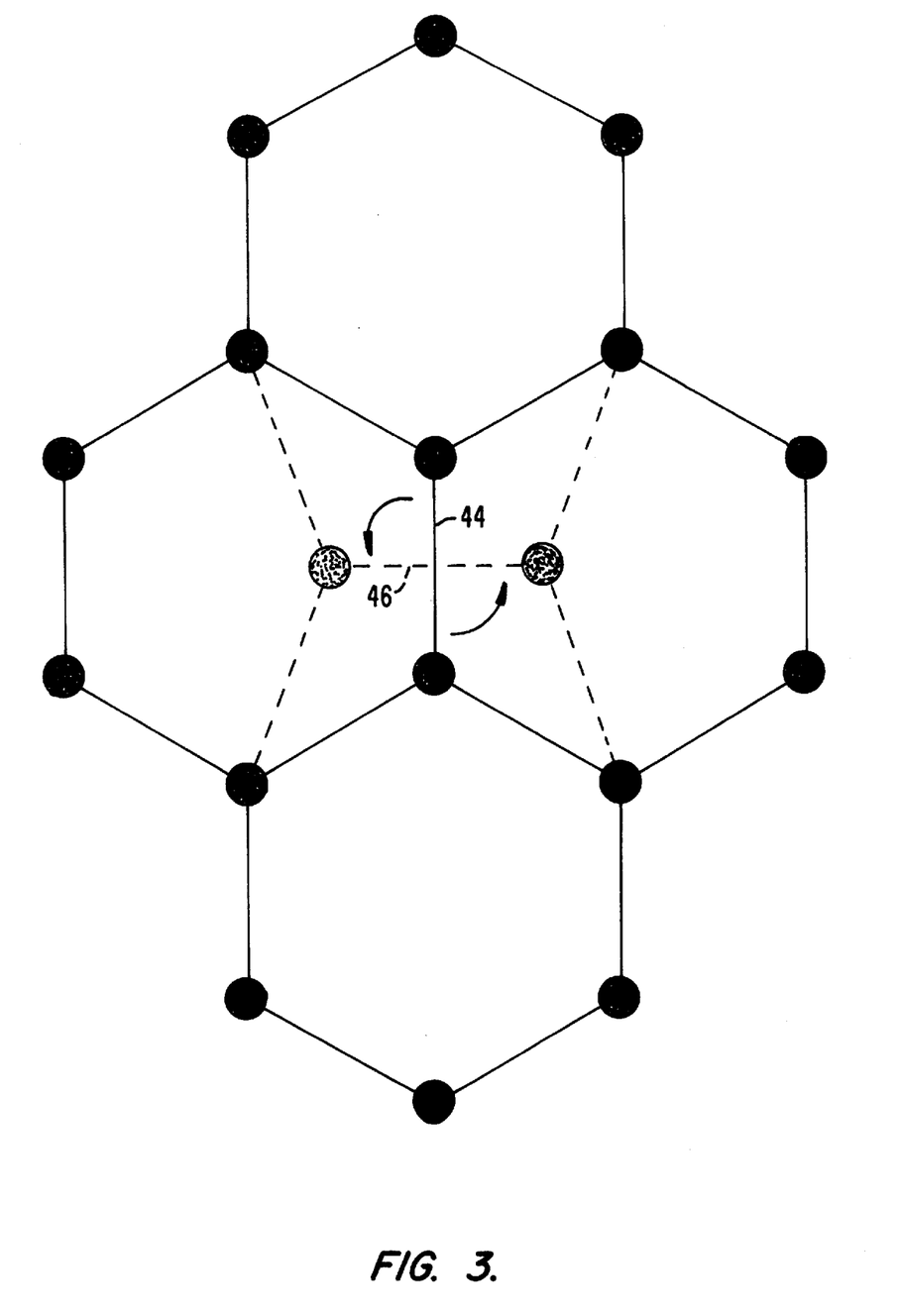
FIG. 3: shows a shift in bonds that converts graphite to interlinked pentagons and heptagons of metallic carbon.

Any structure with an equal number of pentagons and heptagons and threefold vertices has zero net curvature. If the pentagons and heptagons are nearly uniformly distributed in a sheet, local flatness is obtained too. Although there are an infinite number of ways of tiling a plane with equal numbers of heptagons and pentagons, a large subset of physically reasonable tilings can be generated by taking a graphite sheet, dividing it into diamonds of four adjacent hexagons as shown in FIG. 3, and rotating certain bonds by π/2. When the interior bond on the diamond is rotated, two pentagons and two heptagons are created. Other tiling patterns can be devised, for example by clustering pentagons or heptagons. However, bond rotation can produce patterns with minimal local curvature, or equivalently, minimal variation in bond length in a planar structure.

Four-membered carbon rings (squares) and eight-membered carbon rings (octagons) also yield distorted $sp^2$ bonding properties with at least one bond angle different from the other two. Approximate planarity can be maintained using the method described above with two changes: a four-membered ring can replace two five-membered carbon rings, and similarly, one eight-membered carbon ring can replace two seven-membered carbon rings.

We choose to examine in detail the simplest possible way of tiling a plane with pentagons and heptagons, namely a periodic network with one bond rotation per primitive cell. Although there are two distinct ways of decorating a graphite sheet with diamond-shaped primitive cells of four hexagons (see FIG. 3) and then rotating the interior bonds of each diamond, both methods yield topologically equivalent structures with eight atoms per primitive cell. As shown in FIG. 1, each pentagon is adjacent to one pentagon and four heptagons. Each heptagon is adjacent to four pentagons and three heptagons. Two carbon atoms are shared by two pentagons and a heptagon, the other six carbon atoms being shared by one pentagon and two heptagons.

Boron or nitrogen atoms may be substituted for a fraction of the carbon atoms to modify the electronic properties of the inventive carbon material. A boron atom has one less electron than carbon and a nitrogen atom has one more electron than carbon.

Substitution of nitrogen for carbon raises the Fermi energy, while substitution of boron for carbon lowers the Fermi energy. The substituted boron or nitrogen substitutions are not clustered around adjacent carbon sites. Substitution of between about 0.5% and about 30% of the carbon atoms modifies the electronic properties of the inventive material without loss of useful conductivity values. For some applications, substitution of between about 1% and about 20% of the carbon atoms modifies the electronic properties of the inventive material without loss of useful conductivity values. For yet other applications, substitution of between about 1% and about 10% of the carbon atoms modifies the electronic properties of the inventive material without loss of useful conductivity values.

EXAMPLE 5

Fabrication by Controlled Irradiation with Energetic Particles

Turning now to FIG. 3, it can be seen that rotation of bond 44 to position 46 converts graphite to pentaheptite. Numerical calculations were performed to obtain barrier energies of a variety of carbon atom arrangements. The rotation of a single carbon—carbon bond to convert four hexagons in a graphite-like arrangement into a grouping of two pentagons and two heptagons in a pentaheptite-like arrangement (see FIG. 3) was found to have an energy barrier of between about 6 and about 8 electron volts.

The base unit of the bond rotation algorithm of FIG. 3 provides a 16-atom precursor that may be arranged in two nonequivalent orientations to produce the planar pentaheptite structure studied in this work. Azulene itself cannot tile a plane without introducing vacancies or hexagons. Chemically selective intermolecular bonding is aided by local curvature since heptagons tend to form preferentially near pentagons and vice versa.

The approximately 6 to 8 electron volts necessary to rotate the bond and convert a region of four hexagons into a region of two pentagons and two hexagons can be imparted to an atom by scattering an energetic particle, for example an electron or a photon, off of one of the carbon atoms. An electron with kinetic energy over 50 Kiloelectron volts (Kev) has a probability of transferring greater than about 8 electron volts of kinetic energy to a graphite carbon or other atom such as nitrogen or boron in the lattice.

By irradiating graphite with an electron beam directed along the plane of the graphite layers, one can induce local transformation of graphite to a pentaheptite structure. The energy of the electron beam should be below 200 KeV to avoid destroying the $sp^2$ bonding geometry. This process yields a material with hexagons in addition to pentagons and heptagons. When sufficient heptagons and pentagons have been added to satisfy the criteria discussed above, the material becomes a metal.

Our calculations also indicate that the minimum energy to remove an atom from a planar $sp^2$-bonded carbon material is between about 15 eV and about 20 eV. This minimum energy occurs when the kinetic energy of the atom to be removed is directed perpendicular to the plane. If the kinetic energy of the atom to be removed is directed along the plane, the energy required for removal of the atom is between about 30 eV and about 50 eV. These results show that graphite-like material can be converted to metallic carbon by irradiated it so as to impart enough energy to the carbon atoms to convert regions of the material from hexagons to a combination of pentagons and heptagons without destroying the material by ejecting atoms from it.

Pentaheptite can be made by controlled irradiation with energetic electrons starting with graphite sheets and with carbon nanotubes.

Synthesis of planar pentaheptite presents special problems because heptagons are not energetically favored. That is because they do not cap as many dangling bonds as do pentagons. (Note that the 3-fold bonds in graphite have a floating $\pi$ bonded electron so there are no dangling bonds.) A carbon with fewer than three nearest carbon neighbors are energetically unfavored and tend to form pentagons instead of heptagons.

Graphite sheets are used as a starting material to make planar metallic carbon. An electron with a kinetic energy of 30 KeV, bouncing backwards from a collision with a carbon nucleus, can impart a maximum kinetic energy of between about 6 eV and about 8 eV to the carbon atom. For this maximum energy transfer the carbon atom recoils along the direction of the electron beam. The minimum energy necessary to dislodge a carbon atom from an $sp^2$-bonded sheet by recoil within the plane of the sheet is between about 30 eV and about 40 eV, an energy that can be provided by collisions with 130 KeV electrons. Therefore, irradiation of a planar carbon material composed of hexagons by electrons with kinetic energies between 30 and 130 KeV in a beam directed within the plane of the carbon sheets will impart enough energy to individual carbon atoms to cause creation of pentagons and heptagons without causing the excessive damage to the material which would occur if atoms were removed from the planes by the recoil. The cross section (i.e. likelihood) of collisions at this maximum energy transfer is small, so that the beam energy may be larger than the bounds mentioned above and sample damage is still minor over a the course of a brief irradiation. For example, irradiation with electrons of energy between 30 and 250 KeV will create a significant concentration of pentagons and heptagons. At beam energies above 130 KeV a prolonged irradiation must be avoided as it will eventually destroy any planar carbon material.

The backward conversion from pentagons and heptagons to hexagons is also caused by irradiation, so that during irradiation the concentration of pentagons and heptagons will rise until the rates of hexagon creation and pentagon and heptagon creation are equal. Since the energy difference between an assembly of four adjacent hexagons and a pair of heptagons and pentagons is only 0.3 eV, the processes of conversion of hexagons into pentagons and heptagons and of pentagons and heptagons into hexagons are of roughly equal likelihood. This means that the equilibrium concentrations of heptagons and pentagons and hexagons are comparable, and the material synthesized in this fashion satisfies the criteria for metallic carbon described above. Note that squares (four-membered rings) and octagons (eight-membered rings) are unlikely to be created in concentrations above 10% of all rings using this method.

Figure 5A:
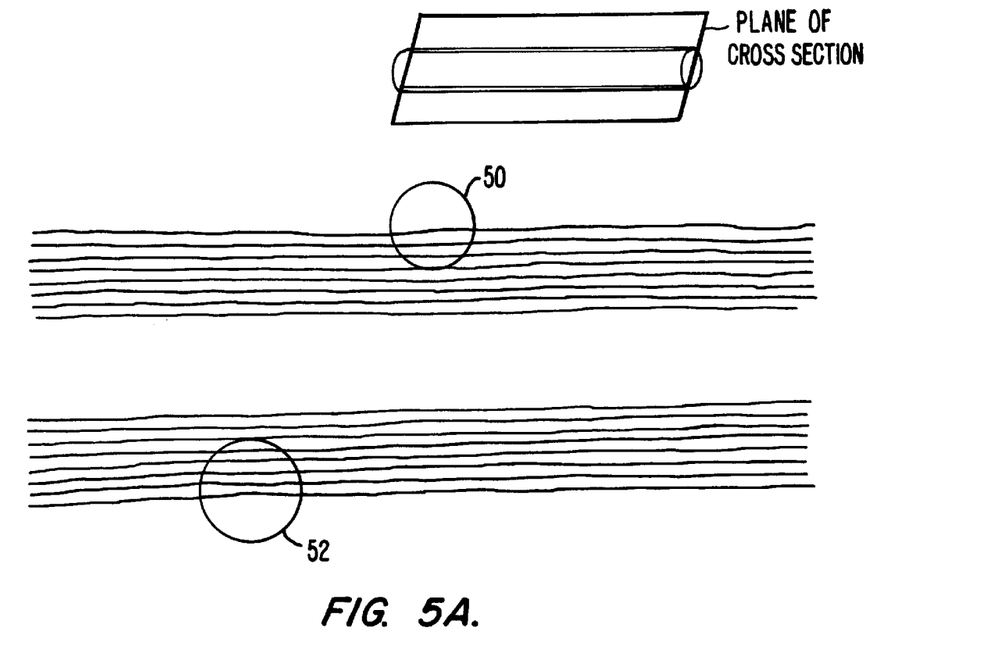
FIG. 5A: shows a cross-section of a multiwalled carbon nanotube, before irradiation with an electron beam; the top of group of lines are the carbon layers in the top portion of the cross-section and the bottom group of lines are the layers in the bottom part of the cross-section.
Figure 5B:
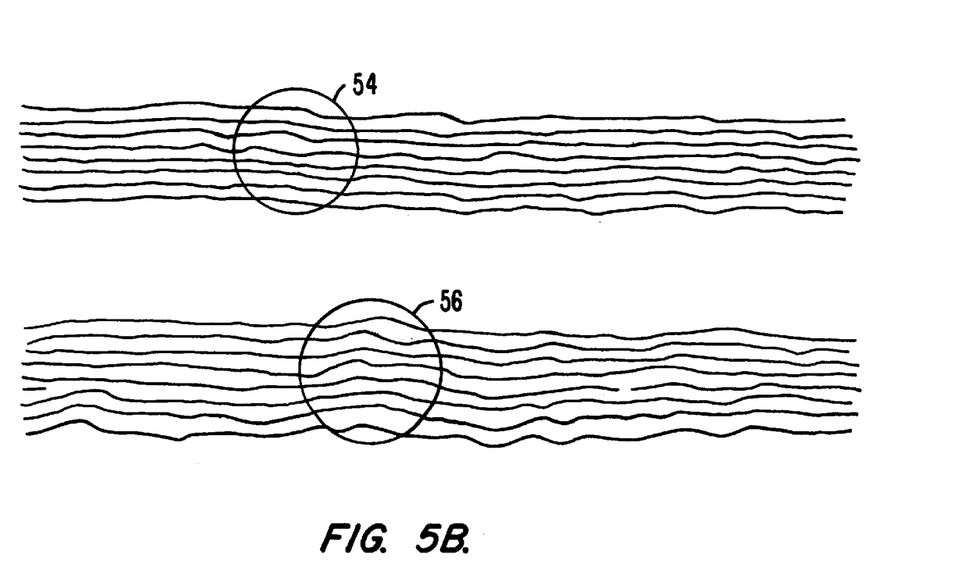
FIG. 5B: shows a cross-section of a multiwalled carbon nanotube, after irradiation with an electron beam; the top of group of lines are the carbon layers in the top portion of the cross-section and the bottom group of lines are the layers in the bottom part of the cross-section.

Multiwalled carbon nanotubes were used as starting material to synthesize regions of pentagons and heptagons forming metallic carbon. FIGS. 5A and 5B show a cross-section of a multiwalled nanotube. The tube is displayed longitudinally; the cross-section is taken through the diameter. FIG. 5B shows the tube after it was irradiated. The electron beam was incident in a direction perpendicular to the plane of the paper. The arc synthesis process that was used to make the nanotube created a low concentration of pentagon and heptagon assemblies in the tube walls. This can be observed in FIG. 5A, regions 50 and 52 as undulations in the walls along the longitudinal direction of the structure. The pentagon and heptagon carbon configurations, adjacent to hexagons, cause a distortion of the planar structure. This was also demonstrated by our calculations with tight binding total energy molecular dynamics, discussed above. Irradiation of the carbon nanotubes using a transmission electron microscope with 200 KeV electrons increased the concentration of pentagons and heptagons, as evidenced by the number and size of the undulations in the walls (see FIG. 5B, regions 54 and 56). Note that a cross-sectional image of the walls is only visible for the top and bottom portions of the tube, and only these portions of the walls are appropriately oriented in the beam direction. As discussed above, this orientation is the preferred orientation for irradiation-production of pentagons and heptagons from hexagons. The results obtained using the 200 KeV electron beam show, particularly clearly, the undulations created by irradiating the sample.

EXAMPLE 6

Fabrication By Wet Chemistry Methods

Polymer chemistry provides another avenue for synthesis. Several different cyclic hydrocarbons containing a multiple of eight carbon atoms provide candidates for the monomer. Halogenated pentalene and the pentalene di-anion are among precursors that are used. Many cyclic structures with side branches are also useable as precursors. Several wet chemistry methods have been used to create planar carbon material. These and related methods should lead to bulk quantities of pentaheptite and similar materials.

A) A chlorinated benzene ring (perchlorobenzene, $C_6C_{16}$) compound was dissolved in toluene and heated near the boiling point of toluene (120° C.). Excess sodium metal was added to the solution to strip the chlorines from the rings and promote ring polymerization. A black conducting carbon material was precipitated out. Preliminary characterization of the material by transmission electron microscopy (TEM) shows it to contain graphite-like regions lacking 3-fold bonding symmetry and amorphous carbon. The defects in the structure, observed by TEM, were consistent with 5 and 7 membered carbon rings like pentaheptite. These results demonstrate the feasibility of using wet chemistry methods to create planar carbon material.

B) One of the basic characteristics of pentaheptite is 5-membered and 7-membered carbon rings that are linked to initiate pentaheptite growth. Azulene ($C_{10}H_8$), a 5–7 ring molecule was first chlorinated (i.e. the hydrogens were replaced by chlorines), by dissolving azulene solid into carbon tetrachloride liquid. $FeC_{13}$ was added as a catalyst. Chlorine gas was bubbled though the mixture at room temperature. The resulting precipitate was dried, then dissolved in tretramethylbenzene. The mixture was heated and excess sodium metal was added to strip the chlorines, leaving the carbon material behind. Alternate starting materials, such as dihydropentelene, can also be used. Dihydropentelene may be obtained from cyclotatrene ($C_8H_8$) by heating the liquid and flowing the vapor through a 510° C. oven and distilling out the dihydropentelene.

EXAMPLE 7

Fabrication by Vapor Deposition and Transport Methods

A) Organic molecules were heated and polymerized with or without UV light. Cyclooctratetrene was heated in an oven for about five hours at temperatures between about 500° C. and about 800° C. with UV light present. The length of time the material is heated can be varied according to the maker's needs. Heating the material for longer times increases the amount of product produced. Planar carbon material was obtained. Optionally, an alkali metal (for example, potassium or lithium) was added to getter hydrogen.

B) Azulene was heated near its boiling point in a quartz tube carbon films were deposited on substrates of sapphire crystal and tantalum disulphide crystal using conventional vapor transport techniques.

C) Laser ablation provides an effective synthesis method for metallic carbon films. Using excimer laser radiation, ablate a graphite target and deposit on a suitable substrate, such as silicon, sapphire, tantalum disulphide, or another lattice-matched material. Laser ablation is an attractive form of synthesis because it promotes structural reconfiguration of the bonds.

D) $C_{10}$ fullerenes are used as a starting material for conversion to planar non-graphite carbon. The fullerene is vaporized and a high power microwave source is used to partially dissociate the fullerenes. The film is deposited on a suitable substrate. The substrate may be seeded with appropriate pentaheptite or other material. Optionally the metallic carbon is grown on an unseeded substrate.

E) Another approach is epitaxial growth on a suitable substrate. Although carbon-substrate interactions may be weak in the completed structure, the interaction between dangling bonds and the substrate in the growing material may modify the kinetic pathways enough to encourage epitaxial growth of the first layer. As regards synthesis, we note that about $\pi/2$ grain boundaries in pentaheptite involve little lattice distortion and should impose at most a minor energetic cost.

EXAMPLE 8

Fabrication by Non-equilibrium Plasma Arc Methods

Non-equilibrium plasma arc methods similar to those in use for fullerene and carbon nanotube production are also useful to produce the inventive metallic carbon. A graphite rod is arced against a cooled cathode, comprising a suitable material such as silicon or sapphire. An appropriate plasma gas such as helium, neon, or argon is used as necessary. Catalytic particles, such as transition metals, in powder or other form, are used as needed. These can be injected directly into the arc or initially inserted into the anode carbon feedstock.

EXAMPLE 9

Fabrication by High Pressure Synthesis

Fullerenes, giant cage-like carbon molecules containing 3-fold coordinated carbon atoms similar to graphite [graphite-like material lacking 3-fold symmetry], amorphous carbon, or other carbon-containing materials are placed into a high pressure synthesis cell, such as a diamond anvil cell. C20 fullerenes, containing a high number of five membered carbon rings is a particularly attractive starting material. For Cn fullerenes, as n increases the percent of five membered carbon rings (pentagons) decreases. It is advantageous to use starting material containing at least 50% pentagons, although fullerenes with higher 'n's can be used. Pressurize the cell and add heat with laser radiation or another source. The cell is pressurized to between about 50 Kbar and about 1000 Kbar. Alternatively, the cell is pressurized to between about 100 Kbar and about 700 Kbar. Preferably, the cell is pressurized to between about 200 Kbar and about 500 Kbar.

EXAMPLE 10

Optical Devices

The inventive metallic carbon is useful in making light weight mirrors with superior mechanical and thermal stability. Furthermore, the difference in the optical properties of metallic carbon and graphite is exploited to make high quality gratings of atomic precision for spectroscopy.

The gratings are formed by alternating metallic carbon and graphitic strips within a layer. Fresnel lenses and other optical elements are formed using the same principle with different geometric patterns. Alternating graphite and metallic carbon in adjacent layers creates interferences from reflections at the interfaces between graphite and metallic carbon, and this effect is used in making interference devices. Alternating layers of graphite and metallic carbon also provide a means to modulate optical properties in one-dimensional or three-dimensional structures.

Thus, the invention provides a metallic electrically-conducting material that is comparable in strength and weight to graphite.

The description of illustrative embodiments and best modes of the present invention is not intended to limit the scope of the invention. Various modifications, alternative constructions and equivalents may be employed without departing from the true spirit and scope of the appended claims.

Having thus described the invention, what is claimed is:

1. A substantially carbon material having a metallic band structure comprising carbon atoms arranged in an approximately planar configuration, each carbon atom bonded to three neighboring carbon atoms thus forming three bond angels, and having at least one of the bond angles unequal to the other two.

2. The material of claim 1 wherein at least one of the bond angles has an absolute-value between about 110° and about 140°.

3. The material of claim 1 wherein at least one of the bond angles has an absolute-value between about 100° and about 115°.

4. The material of claim 1 wherein at least one of the bond angles has an absolute-value between about 130° and about 140°.

5. The material of claim 1 wherein at least one of the bond angles has an absolute-value between about 80° and about 100°.

6. The material of claim 1 stacked in a three-dimensional configuration.

7. A composite comprising between about 70% and about 100% of the material of claim 1.

8. The composite of claim 7 comprising between about 80% and about 100% of the material.

9. The composite of claim 8 comprising between about 90% and about 100% of the material of claim 1.

10. The material of claim 1 wherein approximately half the carbon atoms are arranged in five-membered rings and approximately half the carbon atoms are arranged in seven-membered rings.

11. The material of claim 10 wherein the five-membered rings and the seven-membered rings are arranged approximately uniformly through-out the material.

12. The material of claim 10 wherein a primitive cell comprises two adjacent five-membered carbon rings that share two carbons.

13. The material of claim 12 wherein a unit cell comprises the primitive cell surrounded by six seven-membered carbon rings, four of said seven-membered carbon rings sharing two carbons of the primitive cell and two of said seven-membered carbon rings sharing three carbons of the primitive cell.

14. The material of claim 12 wherein the primitive cell is displaced between about 3.5 Å and about 4.0 Å in a first direction and between about 2.8 Å and 3.1 Å in a second direction orthogonal to the first direction.

15. The material of claim 12 wherein the primitive cell is displaced between about 3.7 Å and about 3.8 Å in a first direction and between about 2.9 Å and 3.0 Å in a second direction orthogonal to the first direction.

16. The material of claim 12 wherein the primitive cell is displaced about 2.77 Å in a first direction and about 2.94 Å in a second direction orthogonal to the first direction.

17. The material of claim 11 wherein four-membered carbon rings take the place of between about 0.1% and about 100% of the five-membered rings at a ratio of one four-membered ring for every two five-membered rings replaced.

18. The material of claim 11 wherein four-membered carbon rings take the place of between about 0.1% and about 50% of the five-membered rings at a ratio of one four-membered ring for every two five-membered rings replaced.

19. The material of claim 11 wherein eight-membered carbon rings take the place of between about 0.1% and about 100% of the seven-membered rings at a ratio of one eight-membered ring for every two seven-membered rings replaced.

20. The material of claim 11 wherein eight-membered carbon rings take the place of between about 0% and about 100% of the seven-membered rings at a ratio of one eight-membered ring for every two seven-membered rings replaced.

21. A substantially carbon material having a metallic band structure comprising carbon atoms arranged in a tubular configuration and having indices m and n that represent an amount of helicity in the tube, wherein, a) the material when unrolled into a planar sheet has carbon atoms bonded to three neighboring carbon atoms thus forming three bond angles, and at least one of the bond angles is unequal to the other two;

b) the index m has an absolute value that is greater than or equal to zero, c) the index n has a value that is greater than or equal to the absolute value of m; and d) the tube has a radius of curvature equal to or greater than three Angstroms.

* * * * *